United States Patent [19]

Ohta et al.

[11] Patent Number: 5,192,644
[45] Date of Patent: Mar. 9, 1993

[54] OPTICAL MEMORY DEVICE

[75] Inventors: Kenji Ohta; Kazuo Van, both of Nara, Japan

[73] Assignee: Sharp Kabushiki Kaisha, Osaka, Japan

[21] Appl. No.: 604,581

[22] Filed: Oct. 29, 1990

[30] Foreign Application Priority Data

Oct. 30, 1989 [JP] Japan .................................. 1-284602

[51] Int. Cl.$^5$ ............................................. G11B 7/24
[52] U.S. Cl. ...................................... 430/338; 430/333;
430/19; 430/495; 430/271; 430/945; 430/962;
430/342; 430/343; 430/345; 346/135.1
[58] Field of Search ................... 430/338, 333, 19, 270,
430/335, 495, 271, 945, 962, 342, 343, 345;
346/135.1

[56] References Cited

U.S. PATENT DOCUMENTS

| | | | |
|---|---|---|---|
| 4,246,337 | 1/1981 | Borrelli et al. | 430/496 |
| 4,626,496 | 12/1986 | Sato | 430/270 |
| 4,737,379 | 4/1988 | Hudgens et al. | 427/39 |
| 4,829,505 | 5/1989 | Boyd et al. | 369/94 |
| 4,865,948 | 9/1989 | Masumoto et al. | 430/270 |
| 4,965,591 | 10/1990 | Kurabayashi et al. | 346/108 |
| 4,984,231 | 1/1991 | Yasuoka et al. | 369/275.1 |

FOREIGN PATENT DOCUMENTS

| | | | |
|---|---|---|---|
| 0128616 | 12/1984 | European Pat. Off. . | |
| 0312399 | 4/1989 | European Pat. Off. . | |
| 56-016948 | 2/1981 | Japan . | |
| 61-175087 | 8/1986 | Japan | 430/270 |
| 64-176926 | 8/1986 | Japan | 430/270 |
| 63-252790 | 10/1988 | Japan . | |
| 63-306090 | 12/1988 | Japan . | |
| 1-148590 | 6/1989 | Japan | 430/495 |
| 1-159839 | 6/1989 | Japan . | |
| 2-105346 | 4/1990 | Japan . | |
| 2-230528 | 9/1990 | Japan . | |

*Primary Examiner*—Charles L. Bowers, Jr.
*Assistant Examiner*—John A. McPherson
*Attorney, Agent, or Firm*—David G. Conlin; Donald R. Castle

[57] ABSTRACT

An improved optical memory device comprising a substrate and a plurality of optical memory layers made of a photochromic material and formed over the substrate, the plurality of optical memory layers being laminated to each other through a heat conductive transparent film, which is adaptable for high density and/or high capacity recording of information.

12 Claims, 1 Drawing Sheet

Prior Art

OPTICAL MEMORY DEVICE

BACKGROUND OF THE INVENTION

1. Field of the Invention

This invention relates to an optical memory device, and more particularly to an optical memory device comprising a recording layer made of the material having a photochromic property, and performing recording and reproduction of information by use of light such as laser beam.

2. Description of the Related Art

In recent years, an optical memory device that can record, reproduce and erase information by use of light is an increasing need as a memory device of high density and high capacity. Among the conventional optical memory devices, an optical memory device using a photochromic material for an optical memory layer (a recording layer) has been well known. Particularly known structure of the optical memory device is as shown in FIG. 2 which comprises a substrate 11 and a series of optical memory layers $R_1, R_2 \ldots R_n$ formed in this order over the substrate 11, the optical memory layers each being made of a photochromic material and being capable of recording information by use of light of specific wavelengths $\lambda_1, \lambda_2, \ldots \lambda_n$, respectively, so that the light application of specific wavelengths to respective optical layers provides a multi-recording with n layers (Japanese Unexamined Patent Publication SH062-165751 (1987)).

Upon recording information, a laser beam of high energy is applied to the optical memory layers, whereby information is written in the optical memory layers through a chemical change of the structure of photochromic material. Upon reproduction, the information recorded is read out based on the intensity of transmitting light of a laser beam of low energy applied to the optical memory layers.

The conventional optical memory device does however have such a problem that when laser beam is applied to an i-th layer ($i \leq n$) of the optical memory layers to record information, the temperature of the i-th layer rises with temperature of adjacent layers [(i−1)-th and (i+1)-th layers] also rising, resulting in that record of information in the (i−1)-th or (i+1)-th layer vanishes or the optical memory layer (the i-th layer) itself may be deteriorated.

The invention has been accomplished to overcome the above problem. An object of the invention is to provide an optical memory device which is less in temperature rise by the irradiation with light upon recording of information, thereby causing no vanish of recorded information and no deterioration of the optical memory layer.

SUMMARY OF THE INVENTION

According to the present invention, there is provided an optical memory device which comprises a substrate and a plurality of optical memory layers made of a photochromic material and formed over the substrate, the plurality of optical memory layers being laminated to each other through a heat conductive transparent film.

In the optical memory device of the present invention, the heat conductive transparent film dissipates the heat generated in an optical memory layer upon the light application for recording, thereby restraining a rise of temperature of the optical memory layer. Hence, vanish of recorded information in the adjacent optical memory layers or deterioration of the optical memory layer upon the light application for recording can be prevented or notably restrained.

DETAILED DESCRIPTION OF THE PREFERRED EMBODIMENTS

Figure 1:
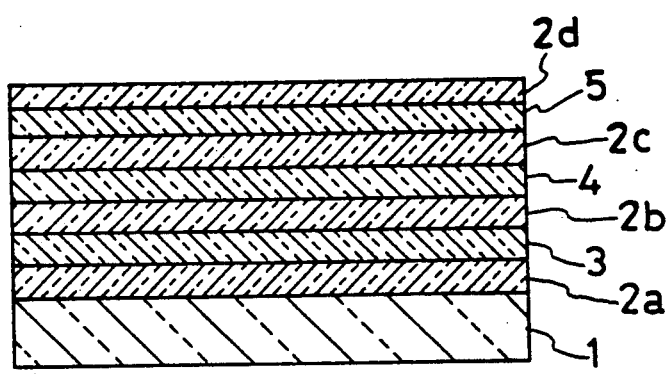
FIG. 1 is an explanatory view showing a structure of an optical memory device prepared by the example of the present invention.
Figure 2:
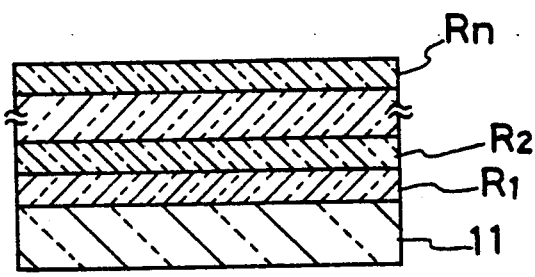
FIG. 2 is an explanatory view showing a structure of a conventional type of optical memory device.

The substrate used in the present invention is for supporting the optical memory layers and may be formed, for example, with glass, plastics (e.g., polymethyl methacrylate, polycarbonate), ceramics, metal (e.g., aluminum) and the like. Among them, the substrate formed with transparent materials such as glass, plastic and the like is preferable in that it allows the optical memory layers to be irradiated with light from either upper or lower side thereof. Preferable thickness of the substrate is about 0.5 to 2 mm when light is to be applied from the lower(back)side of and through the substrate.

The photochromic material in the present invention is used for forming each optical memory layer over the substrate and may comprises an organic compound that can reversibly change in its chemical structure (for example, by tautomerism) by the light irradiation and simultaneously changes its absorption spectrum. Examples of the organic compound include photochromic compounds of spiropyrane, fulgide, dihydropyrane, thioindigo, bipyridine, aziridine, polycyclic aromatic, azobenzene, salicylideneaniline, xanthene, or oxazine. In more detail, such photochromic compounds as disclosed in G.H.Brown, Techniques of Chemistry III, Wiley (1971) may be available. A plurality of photochromic compounds are usually selected as the photochromic materials for forming the optical memory layers being different to each other in absorption wavelength (recording/reproducing wavelength).

The optical memory layer made of the photochromic material may be prepared by the above compounds only or with a mixture of the same and a suitable film-forming material (for example, an organic polymer such as acrylic resin, styrene resin or the like). The optical memory layer may be formed by applying an organic solvent solution of the photochromic compound and the film-forming material, for example, in accordance with spin coating process, and drying the solution layer applied. In this case, it is preferable that an amount of the photochromic compound be 10 to 30 wt% on the basis of the film-forming material. The optical memory layer may be formed by directly depositing the photochromic compound to form a multi-molecular layer in accordance with vacuum deposition or Langmuir-Blodgett's technique. Thickness of the optical memory layer is not specifically limited, but is suitably 0.1 to 50μm, preferably 0.5 to 10μm. The number of the optical memory layers is suitably 2 to 10.

The optical memory layer may contain any coloring agent, dye and the like other than the photochromic material.

The heat conductive transparent film in the present invention is used for dissipating the heat generated in the sensitized portion of the optical memory layer to which the light has been applied, so as to restrain the temperature rise of the optical memory device. The heat conductive transparent films are interposed between a plurality of optical memory layers and require to be higher in heat conductivity than the optical memory layers and also to allow the applied light to sufficiently transmit therethrough. Therefore, the heat conductive transparent film may suitably be thin film made, for example, of a metal nitride or a metal oxide, such as aluminum nitride, silicon nitride, aluminum oxide and the like.

The thin film (the heat conductive transparent film) may be formed selectively, for example, by the CVD process or sputtering process conformable to kinds of thin films to be formed. It is particularly preferable that the thin film be formed in accordance with a low temperature CVD process performed at a temperature lower than 100° C. Thickness of the thin film is suitably 50 to 350 nm, preferably either 60 to 75 nm or 330 to 345 nm. The heat conductive transparent film may be properly interposed between a plurality of optical memory layers and preferably further disposed on the upper and lower surfaces of the uppermost optical memory layer and the lowest optical memory layer, respectively, to more effectively restrain a temperature rise of the optical memory layers.

In the present invention, a protective film made, for example, of an UV cured resin (hard coated film) may be disposed on the uppermost optical memory layer. Preferable examples of the UV cured resin are of urethaneacrylate or epoxyacrylate type and a suitable thickness thereof is about 10 to 50 μm.

EXAMPLE

Next, an example of a practical embodiment of the present invention will be detailed with referring to the attached drawings.

First, an aluminum nitride film 2a of thickness 0.33 μm (Heat conductivity: about 20J/m.s.K, Transparent) was formed, as shown in FIG. 1, on a glass substrate 1 of diameter 130 mm and thickness 1.2 mm in accordance with the CVD process. Then, on the aluminum nitride film 2a was formed in accordance with the spin coating process (Solvent: Methyl ethyl ketone) an optical memory layer 3 (about 0.7 μm in thickness) made of polymethylmethacrylate containing 20 wt% of oxazole derivative substituted heterofulgido compound represented by the following formula, which is sensitive to light of wavelength of 462 nm.

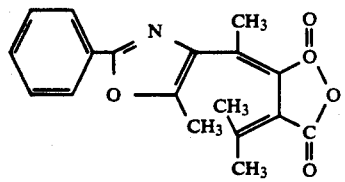

On the optical memory layer 3 was formed a second aluminium nitride film 2b of thickness 0.33 μm, and on which was similarly formed in accordance with the spin coating process an optical memory layer 4 (about 0.7 μm in thickness) which is sensitive to light of wavelength 523 nm and made of polymethylmethacrylate containing 20 wt% of thiophene derivative substituted heterofulgido compound represented by the following formula.

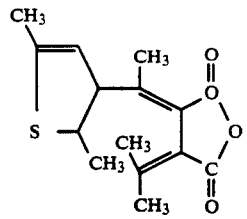

On the optical memory layer 4 was formed a third aluminium nitride film 2c of thickness 0.33 μm, and on which was similarly formed in accordance with the spin coating process an optical memory layer 5 (about 0.7 μm in thickness) which is sensitive to light of wavelength 614 nm and made of polymethylmethacrylate containing 20 wt% of pyrrole derivative substituted heterofulgido compound represented by the following formula.

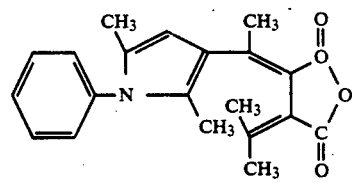

Lastly, a fourth aluminium nitride film 2d of thickness 0.33 μm was formed on the optical memory layer 5 to produce an optical memory device of the claimed invention (FIG. 1).

According to recording test by applying light of specific wavelengths 462 nm, 523 nm and 614 nm from the substrate side of the memory device, the optical memory device was confirmed not to cause any vanish of recorded information or deterioration of the optical memory layers due to less temperature rise of the layer, thereby providing an improved stability in recording of information.

What we claimed is:

1. An optical memory device which comprises a substrate and a plurality of optical memory layers made of an organic photochromic material and formed over the substrate, the plurality of optical memory layers being laminated to each other through a heat conductive transparent film.

2. The optical memory device of claim 1 in which the heat conductive transparent film is made of a metal nitride or oxide.

3. The optical memory device of claim 1 in which the heat conductive transparent film is made of aluminum nitride, silicon nitride or aluminum oxide.

4. The optical memory device of claim 1 in which the heat conductive transparent film has a thickness of 50 to 350 nm.

5. The optical memory device of claim 1 in which the heat conductive transparent film has a thickness of either 60 to 75 nm or 330 to 345 nm.

6. The optical memory device of claim 1 in which the heat conductive transparent film is of a deposited layer by a low temperature CVD process performed at a temperature lower than 100° C.

7. The optical memory device of claim 1 in which the photochromic material is selected from the photochromic compounds of spiropyrane, fulgide, dihydropyrane, thioindigo, bipyridine, aziridine, polycyclic aromatic, azobenzene, salicylideneaniline, xanthene or oxazine.

8. The optical memory device of claim 1 in which the optical memory layer comprises a mixture of the photochromic material and a film-forming material.

9. The optical memory device of claim 1 in which the optical memory layer has a thickness of 0.1 μm to 50 μm.

10. The optical memory device of claim 1 in which the substrate is made of a transparent material.

11. The optical memory device of claim 1 in which the substrate has a thickness of 0.5 to 2 mm.

12. The optical memory device of claim 1 which has a protective film on the uppermost optical memory layer.

* * * * *